Figure 2:
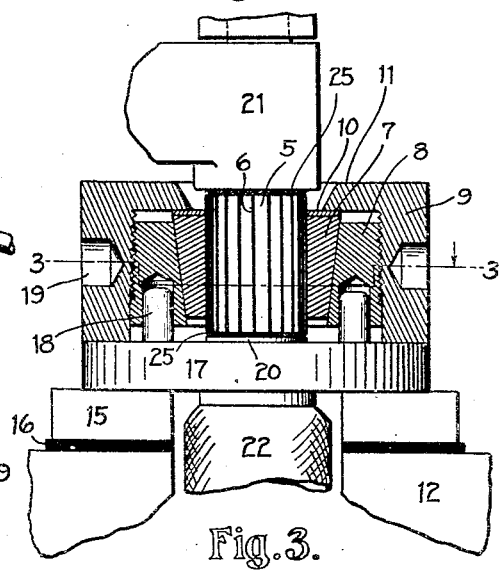

E. A. HALBLEIB.
METHOD OF AND APPARATUS FOR FORMING COMMUTATORS.
APPLICATION FILED JAN. 16, 1913.

1,119,150.

Patented Dec. 1, 1914.

Witnesses:
E. W. Carroll
D. Gurnee.

Inventor:
Edward A. Halbleib
by his attorneys
Osgood, Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

METHOD OF AND APPARATUS FOR FORMING COMMUTATORS.

1,119,150.   Specification of Letters Patent.   Patented Dec. 1, 1914.

Application filed January 16, 1913. Serial No. 742,496.

*To all whom it may concern:*

Be it known that I, EDWARD A. HALBLEIB, a citizen of the United States, and resident of Rochester, in the county of Monroe and State of New York, have invented certain new and useful Improvements in Methods of and Apparatus for Forming Commutators, of which the following is a specification.

This invention relates to a novel method of forming commutators for use in electric generators and motors, and to the apparatus by which this method is carried out.

A commutator, as ordinarily constructed, comprises a series of bars or segments, wedge-shaped in cross-section, consisting of copper or other conductive metal, these bars being arranged and held in the form of a cylinder, and being separated and insulated from each other by interposed plates of mica or other insulating-material. In connection with the insulating-material it is common also to employ binding-material such as shellac, which cements the insulating-material securely in place, and solidifies the entire mass of the commutator. In the construction of the commutator the bars or segments are arranged in approximately their final position, with strips of insulating-material placed between them. The mass so formed is then clamped within a chuck or compressing-device, by which the parts of the commutator are pressed radially together, and while under such compression the mass is heated so as to melt the shellac or other binding-material, and thus permit the parts to be compressed to the fullest possible extent while the binding-material fills all the interstices between the parts and cements them securely together.

The object of the present invention is to improve the process just described, particularly with respect to the manner in which the mass of the commutator is heated while or before it is subjected to compression.
Heretofore it has been the practice to accomplish this result by heating the chuck, by means of a gas-flame or otherwise, the heat being conducted through the walls of the chuck to the commutator. This method of heating is unsatisfactory, however, both because it is comparatively slow, and for the further reason that it involves excessive heating of the chuck, with resulting injury. I have discovered that the commutator may
be heated much more quickly, and injury to the chuck may be avoided, by the passage of a current of electricity through the conductive segments of the commutator, while the commutator is inclosed within the chuck, and to this end I apply suitable electrodes to the ends of all of the commutator-segments simultaneously, and connect these electrodes with a suitable source of current, so that current is caused to flow longitudinally through the commutator-segments. In this manner the commutator is heated directly and quickly, it being entirely unnecessary to heat the chuck by any extraneous means. As it is preferable, however, to heat the chuck to some extent, both to expedite the heating of the commutator, and to prevent cooling of the outer surface of the commutator by the chuck, I employ, in the preferred embodiment of the invention, an alternating heating-current. This current not only heats the commutator-segments directly, owing to their resistance to the flow of the current, but it also induces eddy-currents in the body or shell of the chuck, and these currents, in turn, heat the chuck, although not to a destructive degree.

Figure 1:
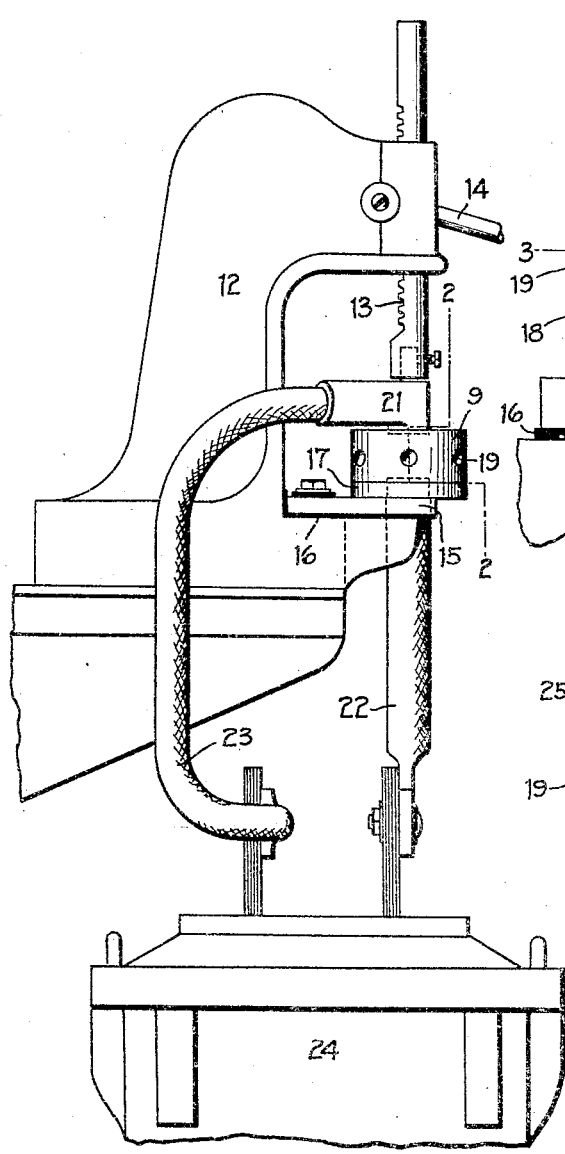
Figure 3:
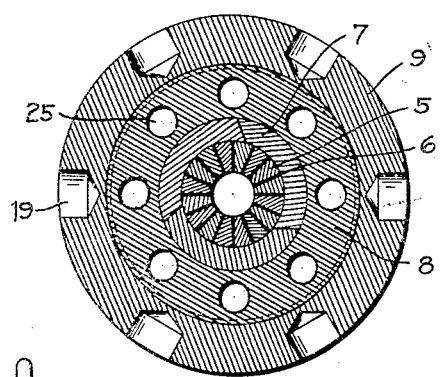
Figure 4:
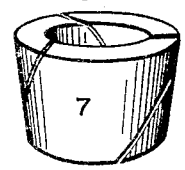

In the accompanying drawings:—Figure 1 is a side-elevation of an apparatus adapted for forming commutators in the manner above described; Fig. 2 is a section on the line 2—2 in Fig. 1, but on a larger scale; Fig. 3 is a sectional plan-view of the chuck and the commutator, on the line 3—3 in Fig. 2; and Fig. 4 is a perspective detail-view of the jaws of the chuck.

In the drawings a partially-completed commutator of ordinary form is illustrated, this commutator comprising conductive bars or segments 5, and interposed layers 6 of insulating - material. The commutator-parts, having been assembled in proper position, are inclosed within the chuck, which has three tapered jaws 7 having smooth cylindrical inner surfaces which engage the cylindrical surface of the commutator. The chuck-jaws 7 are seated within the tapered bore of an annular member or ring 8, and this, in turn, is screw-threaded into the cylindrical body or shell 9 of the chuck. This body has an inwardly-extending flange 11 at its upper end, which engages a washer 10 resting upon the upper ends of the chuck-jaws. Accordingly, when the ring 8 is screwed into the body 9 it acts, owing to the conical form of the chuck-jaws and the inner surface of the ring, to force the jaws inwardly and thus compress the commutator radially.

The chuck above described is used in connection with a press, which is employed to force the electrodes into firm engagement with the ends of the commutator. This press, as illustrated in Fig. 1, has a frame 12 of ordinary form, supporting a sliding plunger 13 which is actuated by a hand-lever 14. The lower portion of the frame 12 is bifurcated and supports a bifurcated plate 15, which is insulated from the frame by a sheet 16 of insulating-material. Upon the plate 15 is fixed a bed-plate 17, which is provided with a series of upwardly-projecting pins 18. These pins are adapted to engage openings 25 in the bottom of the ring 8. Accordingly, when the chuck is placed upon the bed-plate and the pins are engaged with these openings, the ring is locked against rotation, and by means of a suitable spanner, engaging sockets 19 in the chuck-body 9, this body may be turned, thus causing the ring 8 to be screwed into the chuck-body and closing the jaws of the chuck against the commutator.

The means for passing the heating-current through the commutator-segments comprise two electrodes 20 and 21, adapted to engage the lower and upper ends, respectively, of the commutator-segments 5. The electrode 20 is mounted in the base-plate 17, while the electrode 21 is fixed to the plunger 13 of the press. By means of flexible conductors 22 and 23 the electrodes are connected with the terminals of an electric transformer 24 of ordinary form, this transformer being adapted to provide a heating-current of great volume and low electromotive force.

After the commutator-members have been introduced in the chuck, and the jaws of the chuck tightened against them, the chuck is placed upon the bed-plate 17, and the press is then operated to force the electrode 21 down firmly against the upper end of the commutator. By this action the commutator-segments are forced downwardly, through the chuck-jaws, sufficiently to cause them to firmly engage the electrode 20 as well.

In order to compensate for slight inequalities in the ends of the commutator-segments, and to secure a thorough electrical contact between the electrodes and the segments, a piece of wire-gauze 25 is applied to the face of each electrode, this material being sufficiently yielding to compensate for slight irregularities in the surfaces which would tend, otherwise, to result in imperfect contact. Alternating current is then supplied to the transformer in any suitable manner, causing an alternating heating-current to flow longitudinally through the commutator-segments, and at the same time producing eddy-currents in the body 9 and the ring 8 of the chuck. In this manner the commutator is very quickly heated, three minutes being usually sufficient for the purpose, and when the temperature of the commutator has reached a suitable point, which I have found in practice to be about 500° Fahrenheit, the binding-material of the commutator is thoroughly softened, and the chuck-body is then rotated to tighten the chuck-jaws upon the commutator and compress the parts firmly to their final position. The chuck may then be removed from the press and the commutator allowed to cool while still in the chuck, and at the same time another chuck may be placed upon the press and the same operation repeated without delay.

I claim:—

1. The method of forming commutators which consists of assembling the commutator-segments with interposed insulating-material, inclosing the mass in an annular conductive body, causing an alternating current to pass longitudinally through the commutator-segments, thereby heating the mass directly and simultaneously heating the inclosing-body by induced electric currents, and compressing the segments radially, within said body, to their final position while hot.

2. Apparatus for forming commutators having, in combination, a chuck adapted to hold the assembled elements of a commutator and to subject said elements to radial compression, the chuck having an annular electrically-conductive-body, and means for causing an alternating heating-current to pass longitudinally through the conductive segments of the commutator, whereby the segments are heated directly by said current and the chuck-body is heated by the induction of eddy-currents therein.

EDWARD A. HALBLEIB.

Witnesses:
    FARNUM F. DORSEY,
    D. GURNEE.